Feb. 19, 1957    L. P. GUILFOYLE    2,781,578
MOTOR DRIVEN HAND CARVING KNIFE
Filed July 1, 1955
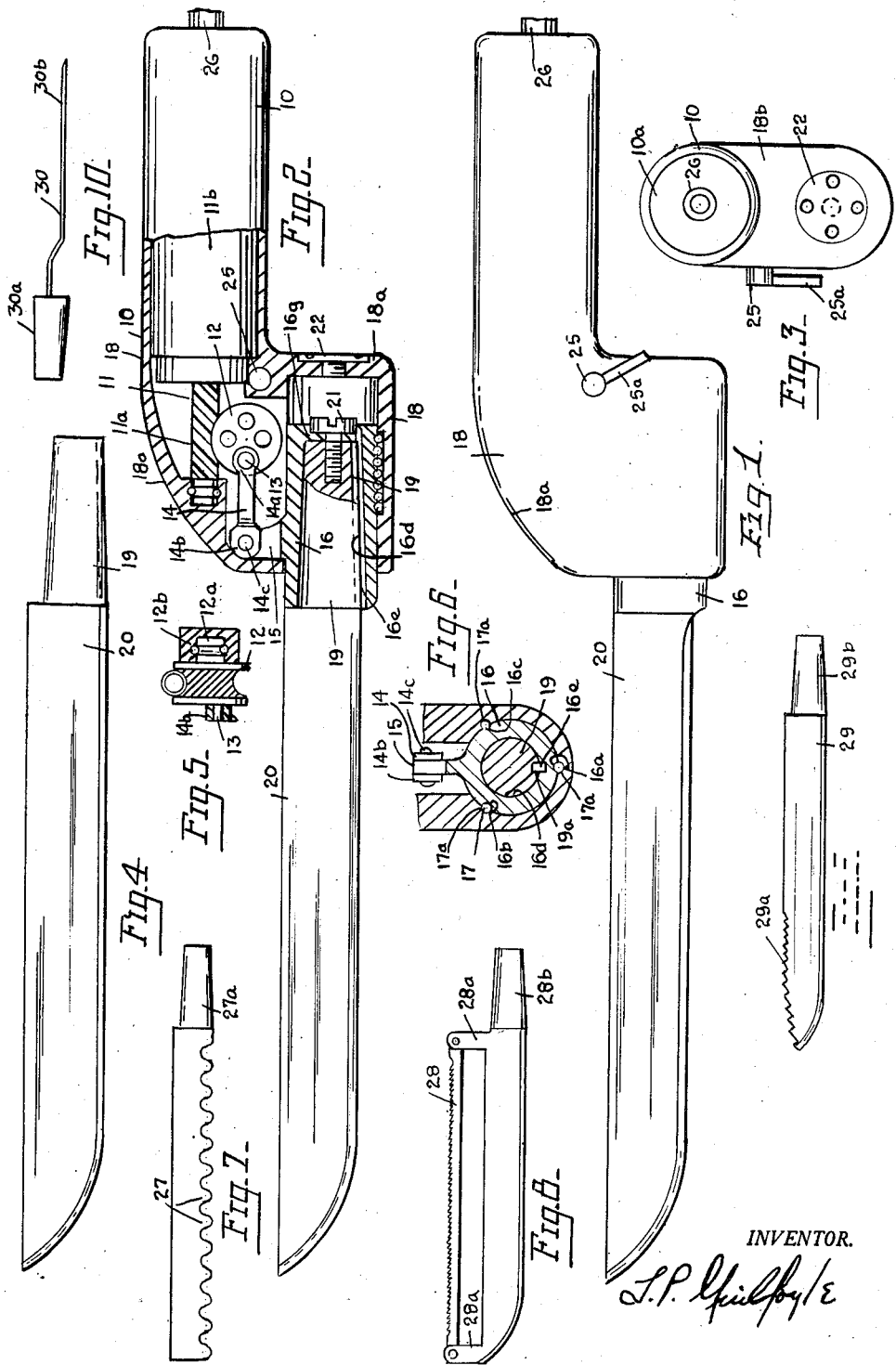
INVENTOR.
L. P. Guilfoyle

United States Patent Office 2,781,578
Patented Feb. 19, 1957

2,781,578

MOTOR DRIVEN HAND CARVING KNIFE

Leonard P. Guilfoyle, Ridgefield, N. J.

Application July 1, 1955, Serial No. 519,438

6 Claims. (Cl. 30—272)

This invention relates to an improved hand held carving knife, and one of the objects of the invention is the construction of a hand held carving knife which has a handle and a cutting blade mounted to reciprocate in the handle and an electrical motor for operating the carving knife, so that it will be reciprocated to enable the user to carve meat more rapidly, more cleanly and with less bungling.

Another object of the invention is to provide a hand held carving knife with an electrical motor contained in the handle, and a slide having a limited reciprocation in the handle, which is driven by the electrical motor by means of a combined worm gear reduction and a pivoted connecting rod, so that the carving knife, coupled to the slide, will be shifted back and forth, to increase the rapidity and improve the accuracy of cutting meat when the hand held knife is manually pressed against meat to be cut.

Another object of the invention is to provide a motor driven hand meat carving knife with a reciprocated slide having a socket to receive a knife blade tang of special construction, which can be secured in the slide by a screw, so that another knife blade, or any blade of a set of special blades, can be coupled into line position in the slide and driven by the electrical motor contained in the handle of the knife.

A still further object of the invention is the provision of a set of knife blades or cutting tools, which includes a saw for cutting meat bones, a blade with special joint cutting teeth, and a blade having special teeth for cutting bread.

With the above and other objects in view, the invention comprises certain new and useful constructions, combinations and arrangements of parts, clearly described in the following specification and fully shown in the drawings:

Fig. 1 is a side elevation.

Fig. 2 is a side elevation, shown partly in longitudinal section.

Fig. 3 is a rear end elevation.

Fig. 4 is a side elevation of the carving knife detached.

Fig. 5 is a detail cross sectional view showing the worm gear and the connecting rod.

Fig. 6 is a detail sectional view through the slide, broken away for convenience.

Fig. 7 is a detail side elevation, on a reduced scale, showing a bread knife blade with a serrated edge.

Fig. 8 is a detail side elevation of a knife blade provided with a saw blade.

Fig. 9 is a detail side elevation of a knife blade provided with cut saw teeth for cutting bone joints.

Fig. 10 is a detail side elevation of a cake and pie spatula.

Referring to the accompanying drawings, which illustrate the practical embodiment of my invention 10 designates a tubular handle, in which is housed a small portable electric motor designed to be operated by house current, or any other suitable voltage current. The shaft 11 of the motor armature is provided with a gear worm 11a which engages the teeth of the worm gear 12, which is provided with a stub shaft 12a, pivoted in bearing 12b. The worm gear is also provided with a lateral drive pin 13, which is engaged by the rear bearing 14a of the connecting rod or link 14, the forward bearing 14b of which is pivotally connected with the upstanding lug 15 of the tubular slide 16.

The tubular slide is formed with an approximately cylindrical external surface and provided with three parallel, longitudinal bearing grooves 16a, 16b and 16c, spaced equally from each other, and which are engaged by the rows of bearing balls 17, disposed in matching grooves 17a formed in the housing 18 for the slide, which is cast or forged integral with the tubular knife handle.

The tubular slide is formed with a slightly tapered internal wall 16d, which snugly receives the mating tapered tang 19 of the carving knife blade 20, formed or forged integral with the tang. The tang being conical to have a forced fit in the conical socket of the slide. The knife tang is formed with a longitudinal keyway 19a which receives the key 16e of the slide, so that the knife will not rotate in the slide. The knife is secured against relative longitudinal in the slide by means of a screw 21, which is threaded into the rear end of the knife blade tang 19 through the rear end wall 16g of the slide.

The housing 18 is provided with a forward sloping wall 18a, which shields the worm gearing and forms a limit stop to control the penetration of the carving knife into meat. Directly under the forward end of the tubular handle the rear end of the housing 18 has an integral wall 18b, which forms a guard for the hand of the user, and a large headed screw 22 is threaded into this wall, in axial alignment with the screw 21, which holds the tang of the knife blade. By removing the screw 22 the screw 21 may be removed and the tang of the knife blade driven out, and another knife blade mounted in service position.

The slide is reciprocated a short distance, determined by the distance of the driving pin 13 from the axis of the stud shaft of the worm gear. The motor shaft worm makes many revolutions for each revolution of the worm gear, so that the connecting lnk will be reciprocated at a lower speed than the rotation of the motor shaft, and the energy of the motor will be concentrated on driving the slide. Due to the ball bearings on which the slide is reciprocated friction is reduced to a minimum, and these ball bearings act to key the slide against relative rotation in its housing 18.

A hand operated switch 25 is provided on one side of the housing, and is shown to be provided with a lever 25a to make operation easier. This switch is of the type known as self opening, so that when finger pressure is removed from the lever the knife blade operating motor will be cut-off from current supplied to the motor by a current supply cord including the usual two wires, indicated at 26.

The knife blade shown in Figs. 1, 2 and 3 is a ground edge meat carving one, but various other types of blades or cutting tools may be used.

In Fig. 7 I show a bread and cake cutting blade, having zig-zag cutting teeth 27, and the usual conical tang 27a.

Fig. 8 shows a blade having a cutting edge on one side and a saw blade 28 mounted on lateral holding lugs 28a on the other side, and the usual holding tang 28b.

Fig. 9 shows a cutting blade 29 having a convex forward end cutting toothed edge 29a for cutting bone joints, and provided with the usual conical tang 29b.

Fig. 10 shows a cake and pie stripping tool or spatula 30, having an offset conical tang 30a, and the thin flexible blade 30b.

My invention thus provides for a portable motor drive for a variety of cutting knives and kitchen tools, which requires little skill in operating, which does not expose the user to any danger and which in fact adds to the safety of meat cutting, as it provides for rapid, motor driven, short strokes, instead of long, sweeping meat slicing strokes, which often carry the knife edge into positions of actual injury to the operator or other person standing near.

It is understood that various changes in the details of construction, their combination and arrangement may be made in carrying out the invention, defined by the claims hereof.

Having described my invention I claim as new:

1. A meat carving knife having a blade and holding handle thereof, a slide movable on the handle to which the blade is coupled, a row of ball bearings between the slide and the handle disposed in the direction of the movement of the slide, and an electrical motor housed in the handle for reciprocating the slide and knife blade.

2. A meat carving knife having a cutting blade and a handle provided with a slide, an electrical motor housed in the handle, a coupling between the slide and the blade, a row of bearing balls between the slide and the handle, the handle having a groove parallel to its length to receive the bearing balls, and driving mechanism between the shaft of the motor and the slide whereby the slide and the blade are reciprocated on the handle.

3. A meat carving knife having a handle provided with a slide movable therein, a plurality of rows of bearing balls disposed between the slide and the handle and disposed in parallel relation to each other and to the axis of the slide, said slide having a conical socket, a knife blade having a mating conical tang coupled in the slide socket, a motor housed in the handle, and driving mechanism between the shaft of the motor and the slide including worm gearing, for reciprocating the slide at a lower speed than that of the shaft of the motor.

4. A meat carving knife having a tubular handle, an electrical motor housed in the handle and provided with a shaft having a gear worm thereon, a worm gear journaled at the forward end of the handle and engaged by the gear worm, said worm gear having a lateral driving pin, the handle having guide disposed below the same, a slide movable in the guide and forwardly thereof and provided with a conical socket, said slide having a lateral finger, a connecting rod pivotally connecting the driving pin to the lateral finger, means for keying the slide against relative rotation, and a knife blade having a conical tang having a tight fit in the slide socket and secured therein against endwise displacement.

5. A hand used meat carving knife, comprising a tubular handle provided with an electrical motor therein, said motor having an end shaft projecting forwardly of the handle and provided with a gear worm, a slide mounted on and below the forward end of the handle and provided with a socket, ball bearing tracks between the handle and the slide arranged to permit free longitudinal movement in both directions and to prevent relative rotative movement, said slide having a lateral finger, a worm gear mounted forwardly of the motor and having driving connection with said worm, said gear having a lateral driving pin, a connecting rod pivotally connected at one end with said driving pin and at the other end with said finger, and means in the socket for said slide for securing the tang of a carving knife therein.

6. A hand used device, comprising a handle having a guide offset on the handle, a socket sliding in the guide and provided with an internal taper, the guide having a plurality of longitudinal grooves and bearing members disposed in the grooves and engaged by the socket, said bearings keying the socket to the guide against relative rotative movement, a tool having a tapered tang snugly engaging the internal taper of the socket, means for securing the tool in the socket, a link pivotally connected with the socket, a rotary member in the handle having pivotal connection with the link to reciprocate the socket in the guide, and means carried by the handle for driving the rotary member.

References Cited in the file of this patent

UNITED STATES PATENTS

| 292,298 | Gay et al. | Jan. 22, 1884 |
| 2,180,244 | Kosterman | Nov. 14, 1939 |

FOREIGN PATENTS

| 4,715 | Germany | May 28, 1878 |
| 10,243 | Great Britain | of 1897 |
| 102,081 | Sweden | July 15, 1947 |
| 224,265 | Switzerland | Nov. 15, 1942 |